(12) United States Patent
Keller

(10) Patent No.: US 7,798,769 B2
(45) Date of Patent: Sep. 21, 2010

(54) FLEXIBLE, HIGH-TEMPERATURE CERAMIC SEAL ELEMENT

(75) Inventor: Douglas A. Keller, Kalamazoo, MI (US)

(73) Assignee: Siemens Energy, Inc., Orlando, FL (US)

(*) Notice: Subject to any disclaimer, the term of this patent is extended or adjusted under 35 U.S.C. 154(b) by 856 days.

(21) Appl. No.: 11/707,194

(22) Filed: Feb. 15, 2007

(65) Prior Publication Data

US 2008/0199307 A1    Aug. 21, 2008

(51) Int. Cl.
*F01D 11/02* (2006.01)

(52) U.S. Cl. .............. 415/135; 415/173.3; 415/174.2; 29/888.3

(58) Field of Classification Search ............... 415/135, 415/173.3, 174.2; 29/888.3
See application file for complete search history.

(56) References Cited

U.S. PATENT DOCUMENTS

| | | | |
|---|---|---|---|
| 4,274,575 A * | 6/1981 | Flower | 415/174.2 |
| 4,314,792 A | 2/1982 | Chaplin | |
| 4,326,835 A | 4/1982 | Wertz | |
| 4,422,827 A | 12/1983 | Buxe et al. | |
| 4,447,345 A | 5/1984 | Kummermehr et al. | |
| 4,580,946 A | 4/1986 | Bobo | |
| 5,057,465 A | 10/1991 | Sakamoto et al. | |
| 5,228,835 A | 7/1993 | Chlus | |
| 5,281,097 A | 1/1994 | Wilson et al. | |
| 5,460,489 A | 10/1995 | Benjamin et al. | |
| 5,496,045 A * | 3/1996 | Millener et al. | 415/173.5 |
| 5,749,701 A | 5/1998 | Clarke et al. | |
| 5,826,884 A | 10/1998 | Anderton et al. | |
| 5,868,398 A | 2/1999 | Maier et al. | |
| 6,068,930 A | 5/2000 | Lamouroux et al. | |
| 6,132,175 A | 10/2000 | Cai et al. | |
| 6,431,825 B1 | 8/2002 | McLean | |
| 6,471,213 B1 | 10/2002 | Yuri et al. | |
| 6,799,765 B2 * | 10/2004 | Beichl | 277/355 |
| 6,832,892 B2 | 12/2004 | Murphy et al. | |
| 6,852,271 B1 | 2/2005 | DiChiara, Jr. | |
| 7,052,234 B2 | 5/2006 | Wells et al. | |
| 7,093,359 B2 | 8/2006 | Morrison et al. | |
| 7,181,843 B1 * | 2/2007 | Tabbita et al. | 29/888.3 |

* cited by examiner

*Primary Examiner*—Igor Kershteyn

(57) ABSTRACT

A ceramic seal element (200) for use in a turbo-machine comprises a first, rigid portion (210) comprising ceramic fibers (212) bound within a ceramic matrix binder (214), a second, flexible portion (220) comprising ceramic fibers (222), and a third, rigid portion (230) comprising ceramic fibers (232) bound within a ceramic matrix binder (234). Ceramic fibers (222) retain a desired flexibility because they are not bound in ceramic matrix binder. In some embodiments the ceramic fibers (212, 222, 232) are stacked as horizontally disposed layers (225). Also, the fibers (212, 222, 232) of any layer (225) comprise bundles of fibers wherein some of the bundles extend continuously across portions (210, 220, 230). An alternative sealing element (300) comprises a first, rigid portion (310) comprising ceramic fibers (312) that are bound within a ceramic matrix binder (314), and a second, flexible portion (320) that comprises ceramic fibers (313) that retain a desired flexibility. Methods of manufacture are disclosed.

14 Claims, 3 Drawing Sheets

US 7,798,769 B2

FLEXIBLE, HIGH-TEMPERATURE CERAMIC SEAL ELEMENT

FIELD OF THE INVENTION

This invention relates generally to the field of turbo-machines, and more particularly to the field of gas or combustion turbines, and specifically to an apparatus for sealing the gap between adjacent platforms in a row of rotating blades or in a row of stationary vanes, or between other adjacent components in need of a flexible seal element in a turbo-machine.

BACKGROUND OF THE INVENTION

Turbo-machines such as compressors and turbines generally include a rotating assembly having a centrally located rotor shaft and a plurality of rows of rotating blades attached thereto, and a corresponding plurality of rows of stationary vanes connected to the casing of the turbo-machine and interposed between the rows of rotating blades. A working fluid such as air or combustion gas flows through the rows of rotating blades and stationary vanes to transfer energy between the working fluid and the turbo-machine.

A rotating blade of a turbo-machine typically includes a root section attached to the rotor, a platform section connected to the root section, and an airfoil section connected to the platform section on a side opposite from the root section. The lateral side edges of platform sections of adjacent blades in a row of blades abut each other to form a portion of the boundary defining the flow path for the working fluid. While it would be desirable to have adjacent platforms abut in a perfect sealing relationship, the necessity to accommodate thermal growth and machining tolerances results in a small gap being maintained between adjacent platforms. Similarly, arrangements of the stationary vanes that are connected to the casings are in need of a seal between respective adjacent vane members.

Prior art turbo-machines have incorporated many types of devices to seal the gap between the platforms of adjacent blades, and also to provide a mechanical damping there between. For low temperature applications such as a compressor, U.S. Pat. No. 4,422,827 provides a seal of a thin strip of silicone rubber, while U.S. Pat. No. 4,580,946 teaches the use of an elastomeric material or a particular shape to seal the gap between adjacent blade platforms. For higher temperature applications such as a combustion turbine, U.S. Pat. Nos. 4,326,835 and 5,281,097 teach the use of a metal plate affixed under the platforms of adjacent blades to seal the gap.

Seals that comprise a ceramic component also are known in the prior art for turbo-machines. For example, U.S. Pat. No. 6,832,892 teaches a rope seal for placement at each interface between a bucket hook and a groove into which the bucket hook is inserted. In one embodiment, the seal is a braided rope seal formed of a braided metal sheathing that surrounds a ceramic composite matrix. This is stated to provide flexibility and high temperature resistance, and also retain some resiliency.

The above cited patents are incorporated by reference herein for their respective teachings. However, it is recognized that the above-cited, as well as various other prior art devices, are either expensive to manufacture, complicated to install, or lack sufficient sealing effectiveness for modern combustion turbine applications that operate at increasingly elevated temperatures.

Accordingly, there remains a need to provide an improved sealing element for sealing between the platforms of adjacent rotating blades in a turbo-machine, between adjacent vanes, and for other sealing functions in a turbo-machine. There also remains a need to provide a device for sealing that can be manufactured by appropriate modification of known manufacturing techniques, that is easy to install and to remove, and that provides improved sealing effectiveness.

BRIEF DESCRIPTION OF THE DRAWINGS

The invention is explained in the following description in view of the drawings that show.

DETAILED DESCRIPTION OF THE INVENTION

The inventor of the present invention has identified problems with existing rigid seals that are solved by use of sealing elements that comprise a flexible portion. These problems include: difficulty in installation due to rigidity of the seal; relatively rapid wear of seals in their respective slots or grooves; and inability to control leakage through or around the seal. The present invention, as conceived by the inventor, solves one or more of these problems in its various embodiments.

The present invention is directed to seal elements that comprise at least one rigid portion comprising ceramic fibers within a ceramic matrix binder and a flexible portion comprising ceramic fibers that possess a desired flexibility under operating conditions of a turbo-machine, such as a gas turbine engine, in which the respective seal element is utilized. In some embodiments a flexible portion is positioned between two rigid portions, the latter sized to enter, for example, side grooves in adjacently disposed turbine seal blades or vanes. In other embodiments there is a single rigid portion and a single flexible portion, and the seal element may function as a brush seal. Methods of manufacture to obtain these embodiments are described herein.

Figure 1A:
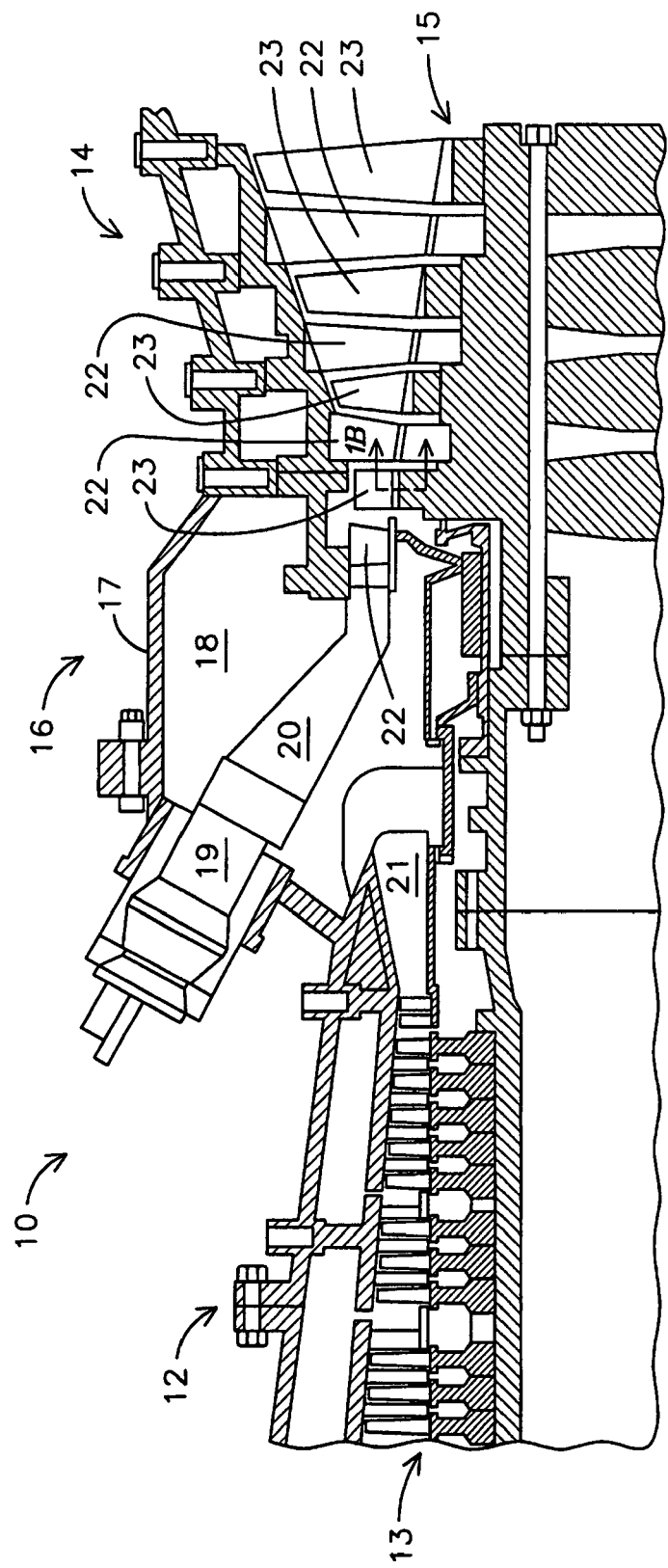
FIG. 1A is a schematic partial lateral cross-sectional depiction of a prior art gas turbine 10 showing major components.

Embodiments of the present invention are used in turbo-machines, such as a gas turbine engine as represented in FIG. 1A. FIG. 1A provides a schematic partial lateral cross-sectional depiction of a prior art gas turbine 10 showing major components. Gas turbine engine 10 comprises a compressor 12 at a leading edge 13, a turbine 14 at a trailing edge 15 connected by shaft (not shown) to compressor 12, and a mid-frame section 16 disposed there between. The mid-frame section 16, defined in part by a casing 17 that encloses a plenum 18, comprises within the plenum 18 a combustion chamber 19 (such as a can-annular combustor) and a transition 20. During operation, in axial flow series, compressor 12 takes in air and provides compressed air to an annular diffuser 21, which passes the compressed air to the plenum 18 through which the compressed air passes to the combustion chamber 19, which mixes the compressed air with fuel (not shown), providing combusted gases via the transition 20 to the turbine 14, whose rotation may be used to generate electricity. It is appreciated that the plenum 18 is an annular chamber that may hold a plurality of circumferentially spaced apart combustion chambers 19 each associated with a downstream transition 20. Likewise the annular diffuser 21, which connects to but is not part of the mid-frame section 16, extends annularly.

The turbine 14 provides a number of stationary vanes 22 and rotatable blades 23. Segments of such vanes 22 and blades 23, which respectively fit together to form annular vane and blade units (or groups), are sealed at each junction between two adjacent segments. A simplified example of such a sealing at a junction is depicted in FIG. 1B, which is a partial schematic section along B-B of FIG. 1A, depicting only one seal junction.

Figure 1B:
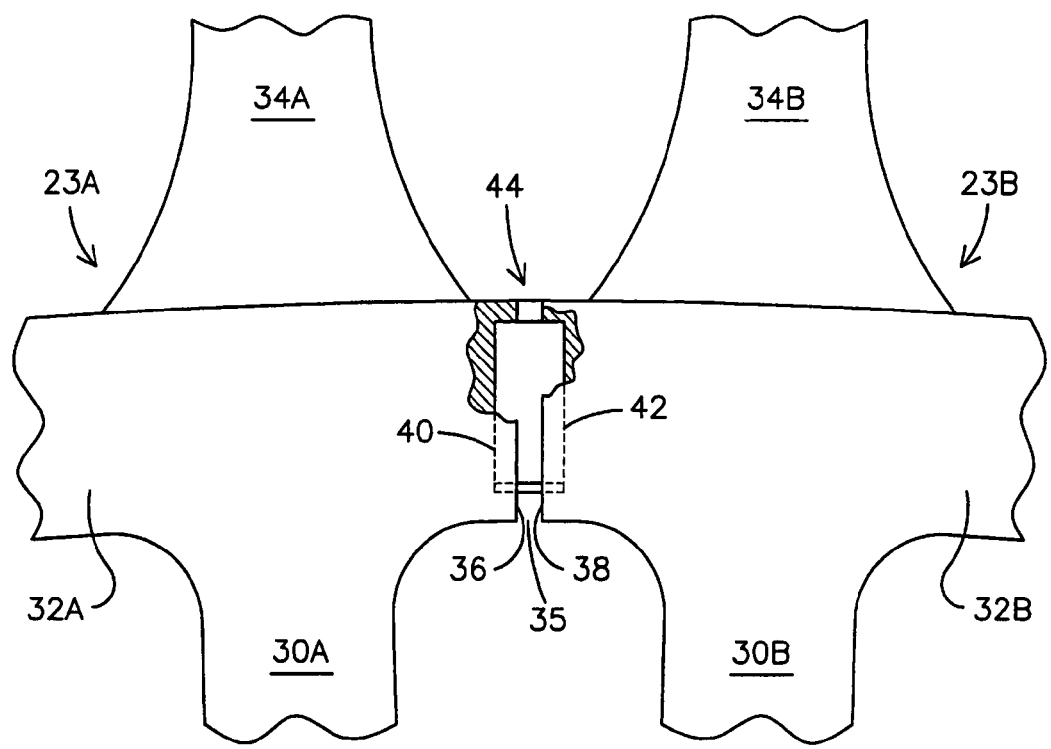
FIG. 1B is a partial, partially cut-away view, taken along B-B of FIG. 1A, that shows certain details of two adjacent blade segments.

In FIG. 1B are depicted two adjacent blade segments 23A and 23B (not shown in their entirety), which are members of a blade group that extends circumferentially about the center longitudinal axis (not shown) of the gas turbine engine 10 of FIG. 1A. Each blade segment 23A and 23B respectfully comprises a root 30A and 30B, a platform 32A and 32B, and an airfoil 34A and 34B. A gap 35 exists between adjacent lateral side edges 36 and 38 of platforms 32A and 32B. One or more grooves 40, 42 provide a space into which seals, such as sealing elements of the present invention, are inserted to provide a sealing function. It is appreciated that centrifugal force during operation tends to urge a seal positioned within grooves 40 and 42 toward groove 42 as the blades rotate about the axis of the rotor shaft (not shown).

Embodiments of the present invention may be incorporated as sealing elements to join adjacent turbine blade sections such as are described above, as well as adjacent turbine vane sections, and other components of a turbo-machine.

Figure 2A:
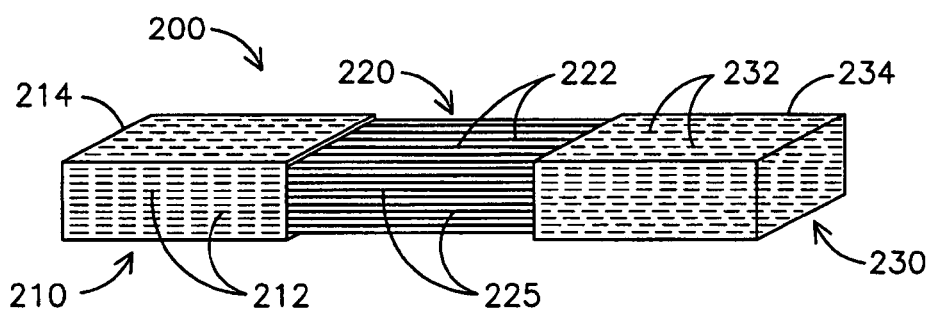
FIG. 2A is a side perspective view of a ceramic seal element exemplary embodiment of the present invention.

FIG. 2A provides one exemplary embodiment of the present invention. In FIG. 2A is a ceramic seal element 200 for use in a turbo-machine, shown in side perspective view. Ceramic seal element 200 comprises a first, rigid portion 210, comprising ceramic fibers 212, shown as dashed lines since they are bound within a ceramic matrix binder 214. Ceramic seal element 200 also comprises a second, flexible portion 220, comprising ceramic fibers 222. These ceramic fibers 222 retain a desired flexibility because they are not bound in ceramic matrix binder as is the first, rigid portion 210. These are depicted as solid lines although they may be, as described below, part of a woven fabric or other form of ceramic fibers in which one or more bundles of ceramic fibers extend continuously through the portions. Ceramic seal element 200 also comprises a third, rigid portion 230, that like the first portion comprises ceramic fibers 232 (shown as dashed lines) that are bound within a ceramic matrix binder 234.

In some embodiments no ceramic matrix binder is applied to the ceramic fibers 222 of the second, flexible portion 220, thereby providing an undensified portion, while in other embodiments a smaller quantity or different type of ceramic matrix binder, compared to the first, rigid portion 210, may be applied while still resulting in a desired degree of flexibility.

In some embodiments, the first and third rigid portions 210 and 230 are sized to enter grooves (not shown in FIG. 2A, see FIG. 2B) of adjacent blade or vane segments of a turbo-machine such as a gas turbine engine. While not meant to be limiting, the ceramic fibers 212, 222, 232 are stacked as horizontally disposed layers (shown as 225, horizontal lines, in portion 220 but extending across all portions). Also, fibers 212, 222, 232 of any layer 225 may be in the form of bundles of fibers (which may be woven in a pattern), wherein one or more of the bundles of ceramic fibers of the first, rigid portion, the second, flexible portion, and the third, rigid portion is/are provided as continuous bundle(s) of ceramic fibers. That is, such bundles are continuous in that they extend across the boundaries of the portions 210, 220 and 230, and they also may extend substantially from end to end of the seal 200. Also, it is noted that the ceramic fibers defined above as 212, 222, and 232 may in fact be comprised from an initial single piece of ceramic fiber material that is cut to a desired size of the seal element, respective and noted portions of which are thereafter treated in different manners to obtain the ceramic seal element 200. In other embodiments, expected to provide less strength, the ceramic fibers 212, 222 and 232 of each layer are not of a single piece. In various embodiments the ceramic fibers may be in the form of a one-dimensional linear array, such as ceramic tape, or a two-dimensional weave of ceramic fibers, and that each portion may be comprised of multiple layers of such tapes or weaves or other forms to achieve a desired strength, flexibility, and/or passage of fluids there through. Various weave patterns are known in the art and may be utilized in embodiments of the present invention. As but one example, a 3-ply angle interlock is known and may be utilized in various embodiments.

Figure 2B:
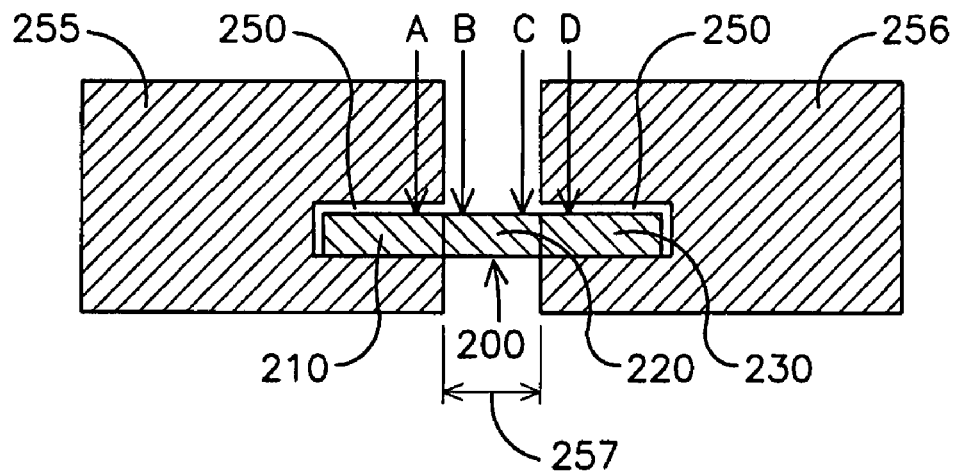
FIG. 2B is a partial schematic cross-section view of the ceramic seal element of FIG. 2A disposed in grooves of adjacent turbo-machine turbine vane platforms.

FIG. 2B provides a partial schematic cross-section view of the ceramic seal element 200 of FIG. 2A disposed in grooves 250 of adjacent turbo-machine turbine vane platforms 255 and 256 (root, airfoil and opposite side groove details omitted). A gap 257 remains between the respective components 255 and 256. The gap 257 allows for thermal growth and misalignment during assembly. The second, flexible portion 220 may be prepared to allow for a designed amount of fluid to pass through itself. The level of such leakage may be optimized for different requirements in different applications within one or more different turbo-machines. Approaches to preparing a second, flexible portion with a designed fluid leakage rate include, but are not limited to: providing a weave of a desired tightness to control fluid leakage; layering a desired number of layers of ceramic fabric of particular weave tightness(es) atop one another; layering a desired number of layers of ceramic fabric of particular weave tightness (es) atop one another, with an offset pattern to the weave; and applying a relatively light coating of ceramic matrix such that a desired flexibility is retained after sintering but the passages through the weave are more restrictive. It is noted that the second, flexible portion 220 between first and third rigid portions 210 and 230 is depicted as having a length approximately the span of the gap 257. However, this is not meant to be limiting. In various embodiments, a flexible portion of a sealing element may have a length greater than, or less than, a gap into which the respective sealing element is positioned. Examples of this are shown in FIG. 2B, in that the flexible portion may alternatively extend between points A and D, having a length greater than gap 257, or between points B and C, having a length less than gap 257.

Figure 3:
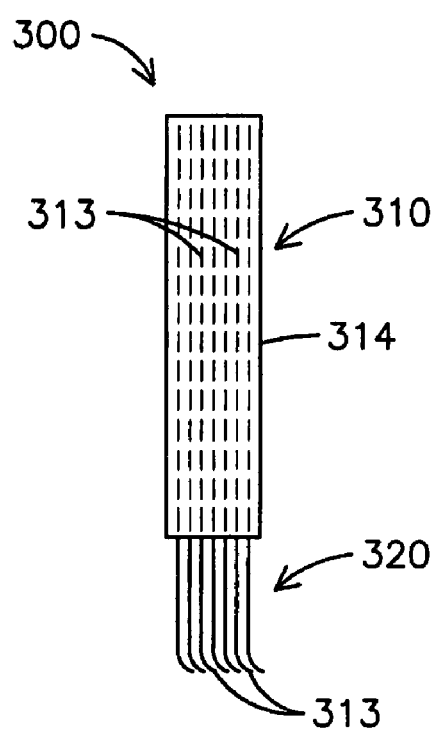
FIG. 3 is a side view of an alternative embodiment ceramic seal element of the present invention comprising a first, rigid portion and a second, flexible portion that may be used as a brush seal.

FIG. 3 provides a side view depiction of another embodiment of the present invention. A ceramic seal element 300 is comprised of a first, rigid portion 310 and a second, flexible portion 320, each comprising ceramic fibers 313 (shown dashed in 310). The ceramic fibers 313 in the first, rigid portion 310 are infiltrated and made dense by ceramic matrix binder 314. Such embodiment 300 may be utilized in various places, although they are particularly suited for use in sealing between stationary and rotating components, such as between the rotor and the stationary vanes (not shown in FIG. 3), where a brush seal is a suitable sealing element. Similar to the embodiment of FIGS. 2A and 2B, a designed amount of fluid leakage through the ceramic fibers 313 of the second, flexible portion 320 may be optimized for different requirements in different applications within one or more different turbo-machines. Also, it is noted that in various embodiments there are one or more bundles of ceramic fibers that extend across the boundary between the first, rigid portion 310 and the second, flexible portion 320; i.e., there are one or more bundles of continuous ceramic fibers.

Seal elements of the present invention may be manufactured by modification of known methods so as to provide a flexible portion adjacent a rigid portion of the sealing element. For example, not to be limiting, a ceramic material may be cut or otherwise fabricated to conform to a desired size, and a fugitive material, such as wax, is applied to the portion that is intended to remain flexible. Any material may be used that remains pliable and has a relatively low melting temperature. The fugitive material may be applied to one or more pieces of said sized material, which before or after such application may be placed in a stack to provide a desired sealing element height. Then a ceramic matrix binder is applied to the portion(s) that is/are to be rigid. This matrix may be applied by any means known to those skilled in the art, so long as the application does not replace the fugitive layer. Molds may be used for the rigid portions, or for the entire sealing element, to help define the sealing element ultimate size.

The ceramic forming process would then proceed by the desired process steps. The fugitive material would burn off, for instance during the first drying cycle or the first firing cycle. This leaves the flexible region with ceramic fibers and no (or little) ceramic matrix binder. At the end of the process, the rigid portions will have formed respective rigid conventional ceramic matrix composites while the flexible region will comprise flexible ceramic fibers.

A brush-type sealing element may be formed by applying the fugitive material only at one end and processing as described above. Alternatively, the above approach may be utilized to form a composition comprising a first, rigid portion, a second (middle) flexible portion, and a third, rigid portion, and then a cut may be made in the second flexible portion to form two brush-type sealing elements.

In various embodiments the ceramic fibers include at least some fiber bundles that extend continuously from end to end of a seal element, which is taken to mean that a particular piece of ceramic tape or weave, comprises some ceramic fiber bundles extending across all portions of the seal element. If a weave, for example, the fiber bundles of the warp may extend from end to end lengthwise, across the boundaries of the rigid and flexible portions, while the fiber bundles of the weft would extend from front to back widthwise. Exemplary ceramic fiber fabrics are comprised of ceramic oxide fibers, such as alumina oxides. Mixtures of fibers may include alumina oxide, silicon carbide, and reinforcement carbon fibers. Ceramic oxide fibers are considered more suited to higher temperature applications because of their environmental stability in oxidizing environments. However, it is within the scope of the present invention to utilize non-oxide ceramic fibers, which may find applications in lower temperature environments.

In a representative manufacturing process, a pre-ceramic slurry is formed by placing ceramic particles in a suspending agent. An exemplary pre-ceramic slurry is the suspension of alumina silicate colloidal particles in a suspending agent of alcohol or acetone. A pre-ceramic aluminum silicate slurry is preferably formed from an alcohol or acetone based aluminum silicate suspension. The pre-ceramic slurry is a suspension of 50-85 weight percent solids in alcohol or acetone as solvent. The solids are composed of 60-100 weight percent of aluminum silicate particulates.

One or more layers of ceramic fibers, such as in the form of a ceramic fiber woven fabric, are cut or otherwise formed to a desired size and arranged into the desired sealing element shape. In an optional step, a desired fugitive material, such as a wax, is applied to a portion of each of the layers that is to be part of the flexible portion. The one or more layers are arranged in the shape of the sealing element to be formed there from, and may be placed in a form or mold (before or after a drying/tacky period, described below). The other (non-flexible, or rigid) portion(s) is/are treated with the pre-ceramic slurry in order to form a ceramic matrix composite (CMC) seal element form. The slurry may be applied to the rigid portions in any number of ways, including but not limited to simply immersing the fabric within the slurry, pulling the slurry through the fabric with a vacuum, and applying the slurry to the fabric with a blade or brush.

After the pre-ceramic slurry is well infiltrated into the non-flexible, or rigid portion(s), at least a portion of the solvent of the slurry is allowed to evaporate. As the solvent evaporates, the pre-ceramic slurry within and on the portion(s) to which it was applied become(s) tacky. After a suitable period of time, depending upon the solvent composition used, the pre-ceramic slurry may become a pre-ceramic paste that has infiltrated throughout this/these portion(s). In various embodiments of preparation, such pre-ceramic paste on the surfaces of these portion(s) provides a tackiness to these surfaces. As noted, at a suitable time the seal element, or one or more portions of it, may be placed in a form or mold to help define its ultimate shape and dimensions. Release agents, as are known to those skilled in the art, may be applied to the outer surfaces.

An optional step is to compress the one or more layers. Compression may be achieved by applying a vacuum, or alternatively by placing the formed materials (layers of ceramic fiber having portions to which a ceramic slurry is applied) into a compressible frame or mold, and applying a pressure to a movable portion of the frame or mold to reduce the interior space of same.

Another step is to raise the temperature to a curing temperature. This may be done while the optional step of compression is being done. An exemplary curing temperature range for a slurry comprising aluminum silicate pre-ceramic is between about 30 and about 180 degrees Celsius (Centigrade). Various temperature elevating and cooling regimes and durations may be applied as are known to those skilled in the art.

Following such curing step, a sintering heat treatment is applied. Exemplary sintering temperatures may be between about 200 and 670 degrees Celsius or higher. Various temperature elevating and cooling regimes and durations may be applied as are known to those skilled in the art. This step achieves the removal of remaining solvent and the fusing of ceramic fibers to the matrix material that was in the CMC slurry.

The sealing element so formed may be of a shape and size ready for use in a turbo-machine, or may need additional forming and shaping to meet the specifications to fit into a desired seal location.

It is noted that all patents, patent applications, patent publications, and other publications referenced herein are hereby incorporated by reference in this application in order to more fully describe the state of the art to which the present invention pertains, to provide such teachings as are generally known to those skilled in the art, and to provide specific teachings as may be noted herein. Also, it is recognized that sealing elements for turbine blades and vanes are but one use of sealing elements of the present invention, and the discussion and the depiction and discussion of such application is not meant to be limiting to the scope of the invention as claimed herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbo-machine ceramic seal element comprising:
   a first, rigid portion comprising ceramic fibers rigidly bound within a ceramic matrix binder; and
   a second, flexible portion, having a first end meeting the first rigid portion, a second end, and comprising ceramic fibers;
   a third, rigid portion comprising ceramic fibers rigidly within a ceramic matrix binder, and disposed at the second end of the second, flexible portion
   wherein the first, rigid portion is sized for positioning in a groove of a turbo-machine component in need of sealing with said ceramic seal element.

2. The turbo-machine ceramic seal element of claim 1, wherein the ceramic fibers of the first, rigid portion, the second, flexible portion, and the third, rigid portion are provided, at least in part, as one or more continuous bundle(s) of ceramic fibers.

3. The turbo-machine ceramic seal element of claim 2, wherein the ceramic fibers in the second, flexible portion are prepared so as to provide a designed fluid leakage rate through the ceramic seal element.

4. The turbo-machine ceramic seal element of claim 1, wherein the first, rigid portion and the third, rigid portion are sized to fit into side grooves of adjacent turbine vanes or blades.

5. The turbo-machine ceramic seal element of claim 4, wherein the ceramic fibers of the first, rigid portion, the second, flexible portion, and the third, rigid portion are provided, at least in part, as one or more continuous bundle(s) of ceramic fibers.

6. The turbo-machine ceramic seal element of claim 4, wherein the second, flexible portion is sized to extend beyond a gap between the adjacent turbine vanes or blades.

7. The turbo-machine ceramic seal element of claim 4, wherein the second, flexible portion is sized to be more narrow than the gap between the adjacent turbine vanes or blades.

8. A turbo-machine comprising a seal element positioned between two turbo-machine components in need of a flexible sealing, the seal element comprising two rigid end portions, each rigid end portion comprising ceramic fibers and a rigid ceramic matrix surrounding the ceramic fibers, and a flexible portion between the two rigid end portions, the flexible portion comprising ceramic fibers not made rigid within the ceramic matrix.

9. The turbo-machine of claim 8, wherein each of the two rigid end portions fit into side grooves of adjacent turbine vanes or blades.

10. A method for manufacture of selectively flexible ceramic seal elements for turbo-machines, comprising:
    applying a pre-ceramic slurry to one or more portions of one or more pieces of ceramic fiber-containing tape or fabric, however leaving at least one portion of each said pieces without the slurry, to yield a partially slurried tape or fabric;
    forming one or more pieces of the partially slurried tape or fabric into a desired shape of a ceramic seal element;
    heating the one or more pieces of partially slurried tape or fabric to a curing temperature for a desired time period; and
    heating the one or more pieces of cured partially slurried tape or fabric to a sintering temperature for a desired time period.

11. The method of claim 10, additionally comprising applying a fugitive material to the at least one portion without the slurry prior to the applying step.

12. The method of claim 10, wherein the forming step comprises placing the one or more pieces of partially slurried tape or fabric into a mold.

13. The method of claim 10, wherein at least two pieces are used, and additionally comprising compressing the two or more pieces prior to the heating steps.

14. The method of claim 13, wherein the forming step comprises placing the compressed two or more pieces of partially slurried tape or fabric into a mold.

* * * * *